(12) United States Patent
Troubounis et al.

(10) Patent No.: US 12,497,313 B2
(45) Date of Patent: Dec. 16, 2025

(54) METHOD FOR CONTINUOUS CLEANING OF PROCESS WATER IN WASTE PAPER TREATMENT WITH CONTROL OF THE CONTENT OF INORGANIC SOLIDS

(71) Applicant: MERI ENVIRONMENTAL SOLUTIONS GMBH, Munich (DE)

(72) Inventors: George Troubounis, Munich (DE); Henning Laubrock, Munich (DE); Lucas Menke, Munich (DE); Luis Domene Figuerola, Munich (DE)

(73) Assignee: MERI ENVIRONMENTAL SOLUTIONS GMBH, Munich (DE)

( * ) Notice: Subject to any disclaimer, the term of this patent is extended or adjusted under 35 U.S.C. 154(b) by 517 days.

(21) Appl. No.: 17/996,646

(22) PCT Filed: Apr. 19, 2021

(86) PCT No.: PCT/EP2021/060038
§ 371 (c)(1),
(2) Date: Oct. 20, 2022

(87) PCT Pub. No.: WO2021/213963
PCT Pub. Date: Oct. 28, 2021

(65) Prior Publication Data
US 2023/0322599 A1    Oct. 12, 2023

(30) Foreign Application Priority Data
Apr. 20, 2020    (DE) ...................... 10 2020 002 363.0

(51) Int. Cl.
C02F 3/28      (2023.01)
C02F 103/28    (2006.01)

(52) U.S. Cl.
CPC ............ *C02F 3/286* (2013.01); *C02F 3/2866* (2013.01); *C02F 3/2846* (2013.01);
(Continued)

(58) Field of Classification Search
CPC ...... C02F 3/286; C02F 3/2866; C02F 3/2846; C02F 2103/28; C02F 2209/10; C02F 2301/046; Y02W 10/30
(Continued)

(56) References Cited

U.S. PATENT DOCUMENTS 4,609,460 A    9/1986  Vellinga
5,338,447 A    8/1994  Vellinga
(Continued)

FOREIGN PATENT DOCUMENTS

CN    207243560 U  *  4/2018
DE    102006032489 A1    1/2008
(Continued)

OTHER PUBLICATIONS

Machine-generated English translation of CN 207243560, generated on Mar. 14, 2025.*
(Continued)

*Primary Examiner* — Fred Prince
(74) *Attorney, Agent, or Firm* — Robert S. Lelkes

(57) ABSTRACT

The present invention relates to a method and to a device for continuous cleaning of process water circulating in a device for treating waste paper. The process water is supplied, from a unit of the device, to an anaerobic reactor comprising a gas separator, and the cleaned process water is returned back to a unit of the device, wherein this unit is selected from: a pulper; screening device; dewatering unit; oxidation/reduction unit; centrifugal screening device; fine screening device; paper-machine mould section; paper-machine press
(Continued)

section; reject treatment unit; fibre recovery unit; and drying section; wherein the content of inorganic solids in the reactor is measured and, if this content exceeds a pre-set limit value, process water from the reactor is continuously fed to a solid-liquid separator for separation into a fraction that is depleted of inorganic solids and a fraction that is enriched with inorganic solids, wherein the fraction that is depleted of inorganic solids is returned to the anaerobic reactor and the fraction that is enriched with inorganic solids is conveyed away out of the device, until the content of inorganic solids in the process water is less than the limit value.

17 Claims, 3 Drawing Sheets

(52) U.S. Cl.
CPC ...... *C02F 2103/28* (2013.01); *C02F 2209/10* (2013.01); *C02F 2301/046* (2013.01); *Y02W 10/30* (2015.05)

(58) Field of Classification Search
USPC ....... 210/603, 609, 614, 781, 787, 252, 259, 210/360.1, 928
See application file for complete search history.

(56) References Cited

U.S. PATENT DOCUMENTS

| | | |
|---|---|---|
| 6,478,963 B1 | 11/2002 | Rossmanith |
| 2010/0025325 A1 | 2/2010 | Menke et al. |
| 2011/0253624 A1 | 10/2011 | Ewing |
| 2012/0031835 A1 | 2/2012 | Gommel et al. |

FOREIGN PATENT DOCUMENTS

| | | | |
|---|---|---|---|
| DE | 102011077271 A1 | | 12/2012 |
| EP | 163749 B1 | | 3/1988 |
| KR | 102023639 B1 | | 9/2019 |
| PT | 1940746 E | * | 1/2011 |
| WO | 2018021169 A1 | | 2/2018 |

OTHER PUBLICATIONS

Machine-generated English translation of PT 1940746, generated on Mar. 14, 2025.*
English translation of the International Preliminary Report on Patentability issued by the European Patent Office on Jul. 8, 2022, in international patent application No. PCT/EP2021/060038.

* cited by examiner

METHOD FOR CONTINUOUS CLEANING OF PROCESS WATER IN WASTE PAPER TREATMENT WITH CONTROL OF THE CONTENT OF INORGANIC SOLIDS

The present invention relates to a method for continuous cleaning of process water circulating in a device for processing waste paper and/or in the paper machine of a machine for manufacturing paper from waste paper, in which process water to be cleaned is supplied, from a unit of the device and/or the paper machine, to an anaerobic reactor, the process water is contacted, in the anaerobic reactor, with anaerobic microorganisms in order to break down impurities contained in the process water, and the cleaned process water is conveyed away from the anaerobic reactor and returned to at least one unit of the device and/or the paper machine.

Processing of process water circulating in a system is necessary in many technical fields, in order to prevent enrichment of the process water with contaminants. This in particular also applies for the process water in paper manufacture, and specifically in particular in the manufacture of paper from waste paper. In recent decades, paper is increasingly obtained from waste paper, in order to reduce the energy consumption during paper manufacture, and in particular in order to reduce the consumption of natural resources. Whereas, in order to manufacture a ton of virgin fiber paper approximately 2.2 tons of wood is required, the wood requirement in the case of paper recycling can be dramatically decreased or reduced to zero, depending on the portion of secondary fibers originating from waste paper, with respect to the total fiber amount in the recycled paper. Furthermore, in the production of recycled paper, only half as much energy and only a third as much fresh water is required compared with the manufacture of paper from virgin fibers. Nonetheless, the quality of recycled paper, for example with respect to the ink resistance, the printing behavior, the degree of whiteness, and the aging resistance, is just as high, today, as that of virgin fiber papers.

In the case of paper manufacture from waste paper, the waste paper is first mixed with water and comminuted in a pulper, while being stirred and mixed, in order to break the individual fiber bonds. Cleaning of the fibers subsequently takes place, in order to remove non-fibrous foreign bodies from the fiber slurry, before the fibers are optionally bleached and finally, optionally after addition of a small portion of virgin fibers, are processed on a paper machine to form paper. A corresponding machine for manufacturing paper from waste paper thus comprises a device for processing waste paper, and a paper machine, the waste paper processing device comprising a waste paper disintegration unit or a pulper, in which process water for disintegrating and comminuting the fibers is supplied to the waste paper, a sorting device for removing impurities, and a dewatering unit for removing process water. It is also known to provide two or more waste paper processing devices or stages, referred to as loops, in the system, in order to increase the quantity of fibers processed from the waste paper. In this case, each loop of the waste paper processing device and the paper machine preferably comprises its own process water processing unit, it being possible for the individual process water processing units to be decoupled from one another using a dewatering means provided between the individual loops. In order to be able to circulate the process water, and thus to be able to minimize the addition of fresh water, the process water must be cleaned to a required extent.

For the purpose of process water cleaning, a plurality of mechanical, chemical and biological methods, and corresponding reactors, are known. In the case of biological process water cleaning, the process water to be cleaned is contacted with aerobic or anaerobic microorganisms, which largely break down the organic impurities contained in the process water into carbon dioxide and water, in the case of aerobic microorganisms, and largely into carbon dioxide and methane in the case of anaerobic microorganisms. In this case, in recent times the biological process water cleaning methods are increasingly carried out using anaerobic microorganisms, because, in the case of anaerobic process water cleaning, on the one hand oxygen does not have to be introduced into the bioreactor using a high amount of energy, and on the other hand high-energy biogas is generated during the cleaning, which can be used subsequently for energy acquisition. Depending on the type and form of the biomass used, the reactors for the anaerobic process water cleaning are divided into contact sludge reactors, UASB reactors, EGSB reactors, solid bed reactors, and fluidized bed reactors. Whereas in the case of fixed bed reactors the microorganisms adhere to fixed support materials, and in the case of fluidized bed reactors the microorganisms adhere to freely movable, small support materials, in the case of the UASB and EGSB reactors the microorganisms are used in the form of what are known as pellets. Methods of this kind, and corresponding reactors, are described for example in EP 0 170 332 A1, in EP 1 071 636 B1 and in EP 0 539 430 B1.

In the case of anaerobic process water cleaning, it is particularly important to ensure that the content of inorganic solids, and in particular of chalk, in the process water contained in the anaerobic reactor is not too high. This is a significant challenge in particular in the case of cleaning of process water in a machine for manufacturing paper from waste paper, because waste paper contains large amounts of chalk in its coating, which is thus necessarily transferred into the process water. Corresponding prevention of too high a content of inorganic solids, and in particular chalk, in the process water contained in the anaerobic reactor is important because a high content of inorganic solids, and in particular chalk, interferes with the operation of an anaerobic reactor, for example in particular UASB reactor. For the function of the microorganism pellets contained in the anaerobic reactor, it is important that these should have a defined specific weight, in order that, during the removal of the organic compounds from the process water, by means of the biogas formed in the process, which adheres to the microorganism pellets, said pellets can rise upwards in the reactor, in order to separate the biogas formed at a gas separator. Following separation of the biogas, the specific weight in particular may not be so high that the microorganism pellets sink to the base of the reactor, since these otherwise can no longer participate in the cleaning process. On account of the structure and size thereof, however, microorganism pellets act as crystallization nuclei for deposits of inorganic solids, and in particular of chalk, such that, at a certain content of inorganic solids, and in particular of chalk, inorganic solids, and in particular chalk, are deposited on the microorganism pellets, said depositions leading to an incalculable shift of the specific weight of the pellets, as a result of which said pellets can no longer fulfill their function. The metabolic activity of the anaerobic microorganisms also brings about a shift in the chalk/carbon dioxide equilibrium due to the generation of inter alia hydrogen carbonate ($HCO_3^-$), which further promotes precipitation of chalk on the microorganism pellets. In order to be able to ensure the function of the microorganism pellets despite the chalk precipitation thereon, the recirculation amounts in the anaerobic reactor would have to be increased, in order to keep the pellets suspended, despite the high specific weight in the reactor. However, the recirculation amount is limited on the one hand by the hydraulic capacity of the separators, and on the other hand by the need to keep the flow in the reactor laminar. High recirculation amounts furthermore bring about the escape of carbon dioxide, and thus a further shift of the chalk/carbonic acid balance towards chalk precipitation, as a result of the development of pressure gradients on the suction and pressure side of the pump, in the recirculation line.

The object of the present invention is therefore that of providing a method for continuous cleaning of process water circulating in a device for processing waste paper and/or in a paper machine of a machine for manufacturing paper from waste paper, using an anaerobic reactor, and a corresponding device for processing waste paper and/or a paper machine of a machine for manufacturing paper from waste paper, in which the process water is efficiently cleaned and in which a malfunction of the operation of the anaerobic reactor is reliably prevented in a simple manner.

According to the invention, this object is achieved by a method for continuous cleaning of process water circulating in a device for processing waste paper and/or in the paper machine of a machine for manufacturing paper from waste paper, in which process water to be cleaned is supplied, from at least one unit of the device and/or the paper machine, to a process water processing unit having an anaerobic reactor comprising one or more gas separators, the process water is contacted, in the anaerobic reactor, with anaerobic microorganisms in order to break down impurities contained in the process water, and the cleaned process water is conveyed away from the anaerobic reactor and returned to at least one unit of the device and/or the paper machine, at least one unit being selected from one or more of pulper, sorting device, dewatering unit, oxidation/reduction unit, centrifugal sorter, fine sorting device, paper-machine mold part, paper-machine press part, reject treatment unit, fiber recovery unit and drying part, in the method, the content of inorganic solids in the process water contained in the anaerobic reactor being measured continuously or discontinuously and, if the content of inorganic solids in the process water contained in the anaerobic reactor exceeds a pre-set limit value, process water comprising solids dissolved and dispersed therein being continuously supplied, from the anaerobic reactor, to a solid-liquid separator for separation into a fraction depleted of inorganic solids and a fraction enriched with inorganic solids, the fraction depleted of inorganic solids being returned to the anaerobic reactor at least in part and the fraction enriched with inorganic solids being conveyed away from the device and/or the paper machine, until the content of inorganic solids in the process water contained in the anaerobic reactor is less than the pre-set limit value.

Since, according to the invention, the content of inorganic solids in the process water contained in the anaerobic reactor having solids dissolved and dispersed therein is measured, and, if the content of inorganic solids in the process water contained in the anaerobic reactor, having solids dissolved and dispersed therein, exceeds a pre-set limit value, process water having solids dissolved and dispersed therein is continuously supplied from the anaerobic reactor to a solid-liquid separator for separation into a fraction depleted of inorganic solids and a fraction enriched with inorganic solids, the fraction depleted of inorganic solids being returned to the anaerobic reactor, at least in part, and the fraction enriched with inorganic solids being conveyed away out of the device and/or paper machine, until the content of inorganic solids in the process water contained in the anaerobic reactor is less than the pre-set limit value, it is ensured, in a procedurally simple and particularly reliable manner, that a malfunction of the operation of the anaerobic reactor due to solids, and in particular chalk, deposits on the anaerobic microorganisms or anaerobic microorganism pellets is prevented. As a result, particularly high efficiency of the anaerobic cleaning is ensured, even over a very long operating period, without maintenance work, such as manual removal of sludge or solids from the anaerobic reactor being required, or laborious additional cleaning stages, such as pressure-relief flotation for decalcification of the process water, being required. For these reasons, the method according to the invention allows for efficient and reliable continuous cleaning of process water circulating in a device for processing waste paper and/or in a paper machine of a machine for manufacturing paper from waste paper.

According to the invention, in the method for cleaning process water circulating in the device and/or paper machine, if the content of inorganic solids in the process water contained in the anaerobic reactor exceeds the pre-set limit value, process water is continuously supplied from the anaerobic reactor to the solid-liquid separator until the content of inorganic solids in the process water contained in the anaerobic reactor is less than the pre-set limit value. In this case, "process water contained in the anaerobic reactor" is understood to mean the mixture contained in the anaerobic reactor, i.e. the process water contained therein including all the substances dissolved and dispersed therein, such as organic compounds, inorganic compounds, and microorganisms (microorganism pellets).

In principle, the present invention is not particularly limited with respect to the type of measurement of the content of inorganic solids in the process water contained in the anaerobic reactor. The content of inorganic solids can in particular be determined as described in DIN 38409-1, January 1987 *"Deutsche Einheitsverfahren zur Wasser-, Abwasser-und Schlammuntersuchung; Summarische Wirkungs-und Stoffgrößen (Gruppe H); Bestimmung des Gesamttrockenrückstandes, des Filtrattrockenrückstandes und des Glührückstandes (H 1)"* [*"German unit operations for the study of water, waste water and sludge; summary effective and material quantities (Group H); determination of the total dry residue, the filtrate dry residue, and the ash residue (H1)"*], and in DIN 38409-2, March 1987 *"Deutsche Einheitsverfahren zur Wasser-, Abwasser- und Schlammuntersuchung; Summarische Wirkungs- und Stoffkenngroßen (Gruppe H); Bestimmung der abfiltrierbaren Stoffe und des Glührückstandes (H 2)"* [*"German unit operations for the study of water, waste water and sludge; summary effective and material parameters (Group H); determination of the filterable materials and the ash residue (H2)"*].

A simple and nonetheless reliable measurement of the content of inorganic solids in the process water contained in the anaerobic reactor can preferably be achieved in that the content of inorganic solids in the process water contained in the anaerobic reactor is measured, in that a sample of the process water contained in the anaerobic reactor is taken, said sample is filtered, the residue obtained during the filtration is dried in a furnace at 105° C. until no further loss of mass occurs, in order to obtain a dried solids residue, the mass of the dried solids residue is measured, the dried solids residue is heat-treated in a furnace at 550° C. until no further loss of mass occurs, in order to obtain a heat-treated solids residue, and the mass of the heat-treated solids residue is measured, the content of inorganic solids in the process water contained in the anaerobic reactor at the time the sample is taken being the quotient of the mass of the heat-treated solids residue and the mass of the dried solids residue. The filtration can in particular be carried out using an ashless filter having a pore size of from 15 to 30 µm and preferably having a pore size of from 20 to 25 µm. Suitable filters are for example ashless blackband and whiteband paper filters. During drying at 105° C., the moisture is removed from the residue obtained during filtration, such that dry solids residue is obtained, which contains both organic solids and inorganic solids. During the subsequent heat treatment at 550° C., the organic solids contained in the dry solids residue are decomposed and removed in the form of gases, such that the heat-treated solids residue consists of inorganic solids and mainly chalk.

The measurement of the content of inorganic solids in the process water contained in the anaerobic reactor can also take place continuously, in that a measuring current of process water is continuously removed from the anaerobic reactor and filtered, the filtrate being guided automatically, continuously or in specified spacings, through a continuous furnace, such as a continuous heating furnace, in which said filtrate is dried for example at 105° C., until no more loss of mass occurs, in order to obtain a dried solids residue, the mass of which is measured in a continuous weighing scale downstream of the continuous furnace. Said dried solids residue is then heat-treated in a continuous furnace at 550° C., the length of the continuous furnace, i.e. the processing time thereof, being set such that the dried solids residue is heated until no more loss of mass occurs, in order to obtain a heat-treated solids residue, the mass of which is then measured in a downstream continuous weighing scale. The inorganic solids content is then determined by a control means as described above, and the method is controlled depending on the continuously determined values.

In order to impair as little as possible, by the removal of the sample, the particularly active microorganism (pellets) not sedimented by deposits on the reactor base, which are present, during the anaerobic method, mainly in the central reactor region with respect to the height of the anaerobic reactor, in a development of the inventive concept it is proposed to remove the sample of the process water contained in the anaerobic reactor from the lower region of the anaerobic reactor, with respect to the height of the anaerobic reactor. The sample is preferably removed from the bottom 20%, particularly preferably from the bottom 10%, and particularly preferably from the bottom 5%, of the anaerobic reactor or from the solid sedimented on the reactor base.

The microorganisms are preferably present in the anaerobic reactor as microorganism pellets.

For the same reasons, it is preferred, according to the invention, to remove the process water, supplied continuously to the solid-liquid separator, in the event of the pre-set limit value being exceeded, from the lower region of the anaerobic reactor, with respect to the height of the anaerobic reactor. In this embodiment, too, it is preferred to remove the process water from the bottom 20%, particularly preferably the bottom 10%, and particularly preferably the bottom 5%, of the anaerobic reactor, with respect to the height of the anaerobic reactor.

In order to allow for deposition of solids, dispersed in the process water, on the reactor base, without unnecessarily swirling the sediment due to the intake and the flow conditions set in the anaerobic reactor, it is provided, according to a particularly preferred embodiment of the present invention, for the lower region of the anaerobic reactor to be designed conically, at least in part, when viewed in cross section. On account of the slopes of the reactor wall of the reactor base, formed thereby in the lower reactor region, sinking of the solids to the lowest region of the reactor base is promoted, such that swirling up in the anaerobic reactor, due to the intake of process water and due to the flow conditions, is minimized.

Good results are obtained in particular if the lower region of the anaerobic reactor is designed as a cone, the cone preferably extending over 1 to 50%, particularly preferably over 1 to 20%, and particularly preferably over 1 to 10%, of the height of the anaerobic reactor.

Instead of a cone, a plurality of cones can also be provided in the lower region of the anaerobic reactor. Preferably, in this alternative embodiment, the lower region of the anaerobic reactor, viewed in cross section, is designed in a zigzag shape, the zigzag-shaped region preferably extending over 1 to 50%, particularly preferably over 1 to 20%, and particularly preferably over 1 to 10%, of the height of the anaerobic reactor. In this embodiment, the reactor base thus comprises a plurality of adjacent conical regions, such that the overall surface of the slopes of the reactor wall of the reactor base is larger than in the previously described embodiment, in which the reactor base is designed as a cone.

Preferably, the limit value for the content of inorganic solids in the process water contained in the anaerobic reactor is pre-set to a value between 30 and 45 wt. %, preferably between 34 and 40 wt. %, particularly preferably between 36 and 38 wt. %, and most preferably to approximately 37 wt. %.

According to a further particularly preferred embodiment of the present invention, it is provided for process water from the anaerobic reactor to be supplied continuously to a solid-liquid separator, and for the fraction depleted of inorganic solids to be returned to the anaerobic reactor, at least in part, until the content of inorganic solids in the process water contained in the anaerobic reactor is at least 1% less than, preferably at least 2% less than, particularly preferably at least 5% less than, and most preferably at least 10% less than the pre-set limit value. Thereafter, the supply of process water from the anaerobic reactor to the solid-liquid separator is ended, until the limit value is exceeded again.

In a development of the inventive concept it is proposed that the process water should be separated in the solid-liquid separator such that the portion of the fraction depleted of inorganic solids is at least 70 vol. %, preferably at least 80 vol. %, and particularly preferably at least 90 vol. %, and the portion of the fraction enriched with inorganic solids amounts to the remainder up to 100%, with respect to the volume flow of the process water supplied to the solid-liquid separator from the anaerobic reactor. As a result a maximum portion of the process water depleted with respect to the solids is or can be returned to the anaerobic reactor again. This is important because the process water, as described above, was preferably removed from the lower region of the anaerobic reactor, and therefore has not yet been sufficiently cleaned with respect to the organic impurities dissolved therein. In contrast the sufficiently cleaned process water is conveyed away out of the upper region of the anaerobic reactor.

For the above reasons, it is also preferred for the process water to be separated in the solid-liquid separator such that the content of inorganic solids in the fraction enriched with inorganic solids is at least 25%, preferably at least 50%, particularly preferably at least 75%, and most preferably at least 100%, higher than the content of inorganic solids in the fraction depleted of inorganic solids.

Good results are in particular achieved if the process water is separated in the solid-liquid separator such that the content of inorganic solids in the fraction enriched with inorganic solids is 1.5 to 5.0 kg/l, preferably 2.0 to 3.0 kg/l, particularly preferably 2.3 to 2.7 kg/l and most preferably approximately 2.5 kg/l, and the content of inorganic solids in the fraction depleted of inorganic solids is 0.1 to 1.5 kg/l, preferably 0.5 to 1.5 kg/l, and particularly preferably 0.5 to 1.0 kg/l.

The control of the above-mentioned parameters can be performed manually or preferably automatically. In the case of manual control, after the pre-set limit value has been exceeded, the continuous removal of process water from the anaerobic reactor, and the supply to the solid-liquid separator, as well as the at least partial return of the fraction depleted of inorganic solids to the anaerobic reactor can be started manually, and the continuous removal of process water from the anaerobic reactor and supply to the solid-liquid separator, as well as the at least partial return of the fraction depleted of inorganic solids to the anaerobic reactor can be stopped manually, as soon as a subsequently removed sample exhibits a content of inorganic solids, in the process water contained in the anaerobic reactor, which is below the pre-set limit value. In the case of automatic control of the above-mentioned parameters, preferably the contents of inorganic solids, measured on the samples, in the process water contained in the anaerobic reactor, are transmitted to an electronic control means, which automatically starts the continuous removal of process water from the anaerobic reactor and the supply thereof into the solid-liquid separator, if the pre-set limit value for the inorganic solids content in the process water contained in the anaerobic reactor is exceeded, and automatically ends the continuous removal of process water from the anaerobic reactor, and the supply thereof into the solid-liquid separator, in the event of falling below a pre-set threshold value for the inorganic solids content in the process water contained in the anaerobic reactor, which is at or below the limit value.

In order not to introduce air, damaging for the anaerobic microorganisms, into the anaerobic reactor by the return of the fraction depleted of inorganic solids, in a development of the inventive concept it is proposed for the solid-liquid separator to at least be designed such that the process water supplied from the anaerobic reactor to the solid-liquid separator, and the fraction depleted of inorganic solids, in the solid-liquid separator, do not come into contact with air. The line, connecting the anaerobic reactor and the solid-liquid separator, for conveying away the process water from the anaerobic reactor and supplying it to the solid-liquid separator, and the return line, connecting the solid-liquid separator and the anaerobic reactor, for returning the fraction depleted of inorganic solids to the anaerobic reactor, are also preferably designed so as to be airtight, for the reasons mentioned above.

In order to achieve efficient separation of the process water, supplied continuously to the solid-liquid separator from the anaerobic reactor, into the fraction depleted of inorganic solids and the fraction enriched with inorganic solids, according to a further particularly preferred embodiment of the present invention it is provided for the separation to be carried out in a solid-liquid separator which comprises one or more centrifugal separators.

Good results are in particular achieved if the separation of the process water, supplied continuously to the solid-liquid separator from the anaerobic reactor, into the fraction depleted of inorganic solids and the fraction enriched with inorganic solids, is carried out in a solid-liquid separator which comprises one or more cyclones. In a cyclone, the separation of the two fractions is achieved in that the supplied process water, comprising the solids dissolved and dispersed therein, is set into a rotational movement in the cyclone, as a result of which the higher-mass fraction is slung against the cyclone inner wall on account of the centrifugal force, from which wall said fraction sinks downwards in the cyclone and can be conveyed away there, while the lower-mass fraction remains in the interior of the cyclones, without touching the cyclone inner wall, and which can therefore be conveyed away out of the cyclone upwards, on account of the flow conditions prevailing in the cyclone.

Furthermore, it is provided, in a further preferred embodiment, for the lower region of the cyclone to comprise a heavy component chamber. Said heavy component chamber is connected, in the upper region thereof, to the lower output of the cyclone, via a first automatic open/close slider A. The lower region of said heavy component chamber has a second automatic open/close slider B for the discharge of the fraction enriched with ash. During operation, the first slider A is open, and the second slider B is closed, such that the high-ash fraction builds up in the heavy component chamber. In particular time intervals, the first slider A closes and the second slider B opens, such that the heavy component chamber is emptied. A rinsing device can also be provided in the heavy component chamber, which device automatically rinses the chamber following emptying, before the second slider B is closed again and the slider A opens, in order to repeat the cycle. The discontinuous emptying of the chamber helps to reduce the reject quantity.

The supply of the process water to the solid-liquid separator can take place via a pump. In order to keep the operating costs of the method according to the invention as low as possible, it is particularly preferable, according to the invention, to arrange the solid-liquid separator and to set the filling height in the anaerobic reactor such that the process water is supplied from the anaerobic reactor to the solid-liquid separator at least to a significant portion, and very particularly preferably only, by the force of gravity. This can be achieved for example in that the height difference between the liquid level in the anaerobic reactor, and the location of the supply of the process water into the solid-liquid separator, is so great that the difference between the hydrostatic pressure in the anaerobic reactor and in the solid-liquid separator is sufficiently great. With respect thereto, it is preferred for the above-mentioned pressure difference to be at least 0.2 MPa, corresponding to 2 bar, and most preferably at least 0.3 Mpa, corresponding to 3 bar.

In a development of the inventive concept, it is proposed to return the fraction depleted of inorganic solids completely to the anaerobic reactor.

The return of the fraction depleted of inorganic solids to the anaerobic reactor can be achieved in a manner simple in design by feeding the fraction depleted of inorganic solids into the intake to the anaerobic reactor. It is therefore preferred for the fraction depleted of inorganic solids to be returned at least in part, and very particularly preferably completely, to the anaerobic reactor via the intake.

On account of the efficiency of the solids and in particular chalk removal from the process water located in the anaerobic reactor, the method according to the invention is extremely suitable for cleaning process water in waste paper manufacture, in which, on account of the chalk contained in the waste paper, without efficient chalk removal significant amounts of chalk would accumulate in the process water. According to the invention, process water to be cleaned is supplied from at least one unit of the device and/or the paper machine to the process water processing unit and, therein, the anaerobic reactor contained in the process water processing unit, and process water cleaned in the anaerobic reactor is conveyed away out of the anaerobic reactor, and returned to at least one unit of the device and/or the paper machine again, from the process water processing unit, at least one unit being selected from one or more of a pulper, sorting device, dewatering unit, oxidation/reduction unit, centrifugal sorter, fine sorting device, paper-machine mold part, paper-machine press part, reject treatment unit, fiber recovery unit and drying part. This includes the process water being removed from one unit and supplied to the process water processing unit, and the cleaned process water being returned from the process water processing unit to the same unit. Alternatively thereto it is also possible, however, for the process water to be removed from the first unit and supplied to the process water processing unit, and for the cleaned process water to be returned from the process water processing unit to a second unit different from the first unit. For example, the process water can be conveyed away out of the sorting device of the device and conducted into the process water processing unit, and the cleaned process water can be returned from the process water processing unit to the pulper. It is furthermore also possible and preferable to convey the process water away from a plurality of units of the device and/or paper machine and to supply it to the process water processing unit, and then return the cleaned process water from the process water processing unit to a unit, preferably the pulper or the sorting device of the device, or the centrifugal sorter of the paper machine. Furthermore, the process water can also be conveyed away from two or more different units and supplied to the process water processing unit, and the cleaned process water can be returned from the process water processing unit to two or more different units. According to the invention, and therefore also in each of the above-mentioned embodiments, at least one and preferably all the unit(s) from which process water is supplied to the process water processing unit, and at least one and preferably all the unit(s) to which process water cleaned in the anaerobic reactor is returned, is/are selected from one or more of a pulper, sorting device, dewatering unit, oxidation/reduction unit, centrifugal sorter, fine sorting device, paper-machine mold part, paper-machine press part, reject treatment unit, fiber recovery unit, and drying part. In this case, the return of the process water cleaned in the anaerobic reactor, out of the process water processing unit and into the at least one unit of the device and/or paper machine, can take place directly, i.e. without further devices being provided between the anaerobic reactor and the unit, or indirectly, in that the process water cleaned in the anaerobic reactor is first subjected to one or more further cleaning stages, such as descaling or filtration.

The present invention further relates to a device for processing waste paper, and/or paper machine of a machine for manufacturing paper from waste paper, in particular for carrying out a method described above, the device and/or the paper machine comprising a process water processing unit for cleaning process water circulating in the device and/or the paper machine, and comprising at least one unit selected from one or more of a pulper, sorting device, dewatering unit, oxidation/reduction unit, centrifugal sorter, fine sorting device, paper-machine mold part, paper-machine press part, reject treatment unit, fiber recovery unit and drying part, and the process water processing unit for cleaning process water circulating in the device and/or the paper machine comprising:

i) an anaerobic reactor comprising one or more gas separators, for anaerobic cleaning of process water, comprising at least one supply line for supplying process water to be cleaned to the anaerobic reactor, and at least one discharge line for conveying away cleaned process water out of the reactor, the process water processing unit being connected to at least one of the at least one unit, such that, during operation of the device and/or paper machine, process water to be cleaned is supplied from at least one unit to the process water processing unit and, therein, the anaerobic reactor, and after the process water processing step cleaned process water is returned into the at least one unit, and ii) a solid-liquid separator for separating process water conveyed away from the anaerobic reactor into a fraction depleted of inorganic solids and a fraction enriched with inorganic solids, comprising a discharge line for the fraction enriched with inorganic solids and comprising a return line for returning the fraction depleted of inorganic solids into the anaerobic reactor, at least in part, a further line leading from the anaerobic reactor to the solid-liquid separator for supplying process water conveyed away from the anaerobic reactor.

The device and/or paper machine according to the invention preferably also comprises control means which can receive measuring data regarding the content of inorganic solids in the process water contained in the anaerobic reactor and into which a limit value and optionally a threshold value can be input, the control means being designed such that it automatically starts the continuous removal of process water from the anaerobic reactor and the supply thereof into the solid-liquid separator, if an input limit value for the inorganic solids content in the process water contained in the anaerobic reactor is exceeded, and automatically ends the continuous removal of process water from the anaerobic reactor, and the supply thereof into the solid-liquid separator, in the event of falling below the limit value or an input threshold value for the inorganic solids content in the process water contained in the anaerobic reactor.

In a development of the inventive concept, it is proposed for the device and/or paper machine to further comprise iii) a measuring device for measuring the content of inorganic solids in the process water contained in the anaerobic reactor. Said measuring device can comprise a furnace and a weighing scale, in order to be able to perform the measuring method set out above. In particular, the furnace can be a continuous furnace, such as a continuous heating furnace, and the weighing scale can be a continuous weighing scale. Continuous weighing scales measure mass flow rates, i.e. the weighing process takes place not punctually, but rather permanently over a previously specified measuring distance. Coriolis flow meters are an example of a continuous weighing scale. Alternatively thereto, the measuring device can also comprise a combination of a means for continuous determination of the total solids content of the process water contained in the anaerobic reactor, and a means for continuous determination of the content of organic solids of the process water contained in the anaerobic reactor, the difference between the total solids content determined thereby and the content of organic solids corresponding to the content of inorganic solids. The means for continuous determination of the content of organic solids can for example comprise a near infrared (NIR) spectrometer, the means for continuous determination of the total solids content being a dispersion density meter, a transmission meter, or the like.

Good results are in particular achieved if the line leading from the anaerobic reactor to the solid-liquid separator opens onto the anaerobic reactor in the reactor part in the lower region, with respect to the height of the anaerobic reactor, preferably in the bottom 20%, particularly preferably bottom 10%, and particularly preferably bottom 5%, of the reactor part comprising the anaerobic reactor.

According to a particularly preferred embodiment of the present invention, the lower region of the anaerobic reactor is designed so as to be conical, at least in part.

According to a variant, the lower region of the anaerobic reactor is designed as a cone, the cone extending over 1 to 50%, preferably over 1 to 20%, and particularly preferably over 1 to 10%, of the height of the anaerobic reactor.

According to a variant alternative thereto, it is preferred for the lower region of the anaerobic reactor, viewed in cross section, to be designed in a zigzag shape, the zigzag-shaped region extending over 1 to 50%, particularly preferably over 1 to 20%, and very particularly preferably over 1 to 10%, of the height of the anaerobic reactor.

Furthermore, the anaerobic reactor preferably comprises one or more gas separators in the central to upper region, preferably at a height of between 30 and 90%, and particularly preferably between 60 and 90%, with respect to the height of the anaerobic reactor, which gas separators are designed such that they prevent anaerobic microorganism pellets from flowing further up in the anaerobic reactor, and thus result in gas adhering to the surface of the anaerobic microorganism pellets being released and the gas being conveyed away out of the anaerobic reactor via the gas separator. Clearwater overflows are preferably arranged above the gas separator, but below the liquid level, which overflows are connected to a discharge line for cleaned process water.

The solid-liquid separator is preferably designed in such an airtight manner that, during operation thereof, said process water supplied from the anaerobic reactor, and the fraction depleted of inorganic solids, in the solid-liquid separator, do not come into contact with air.

In a development of the inventive concept, it is proposed for the solid-liquid separator to comprise one or more centrifugal separators.

Particularly good results are in particular achieved if the solid-liquid separator comprises one or more cyclones.

According to a further particularly preferred embodiment of the present invention, the solid-liquid separator is arranged, and the filling level in the anaerobic reactor can be set, such that, during operation of the device and/or paper machine, the process water can be supplied from the anaerobic reactor to the solid-liquid separator via the line, purely on account of the force of gravity.

The return line for the fraction depleted of inorganic solids preferably opens into the supply line to the anaerobic reactor.

The present invention furthermore relates to a machine for manufacturing paper from waste paper, comprising a device described above for processing waste paper, and a paper machine described above, the device comprising one, two or more stages, each stage comprising a dewatering unit and at least one further unit selected from one or more of pulper, sorting device and oxidation/reduction unit, each stage and the paper machine in each case comprising a process water processing unit as described above.

The paper machine preferably comprises at least one unit selected from a centrifugal sorter, fine sorting device, paper-machine mold part, paper-machine press part, reject treatment unit, fiber recovery unit and drying part, preferably at least two, more preferably at least three, particularly preferably at least four, yet more preferably at least five, yet more preferably at least six, and most preferably all of these.

In this case, the process water processing unit is connected to at least one unit of at least one stage of the device for processing waste paper, and/or to at least one unit of the paper machine, such that, during operation of the machine, process water to be cleaned is supplied from at least one of the units to the anaerobic reactor, and after the process water processing step cleaned process water is returned to at least one of the units again. Furthermore, it is preferred for the process water processing unit, in addition to the anaerobic reactor, the solid-liquid separator, and the optional measuring device, to comprise one or more of a material recovery unit, a pre-acidification reactor, a chalk elimination unit, and a filtration unit. The process water processing unit preferably comprises two, more preferably three, and most preferably all, of the four additional units mentioned above. A preferred sequence of said units is, viewed from upstream to downstream, material recovery unit, pre-acidification reactor, anaerobic reactor, chalk elimination unit, and filtration unit.

The present invention will be described in greater detail in the following, with reference to the accompanying drawings, in which.

Figure 1:
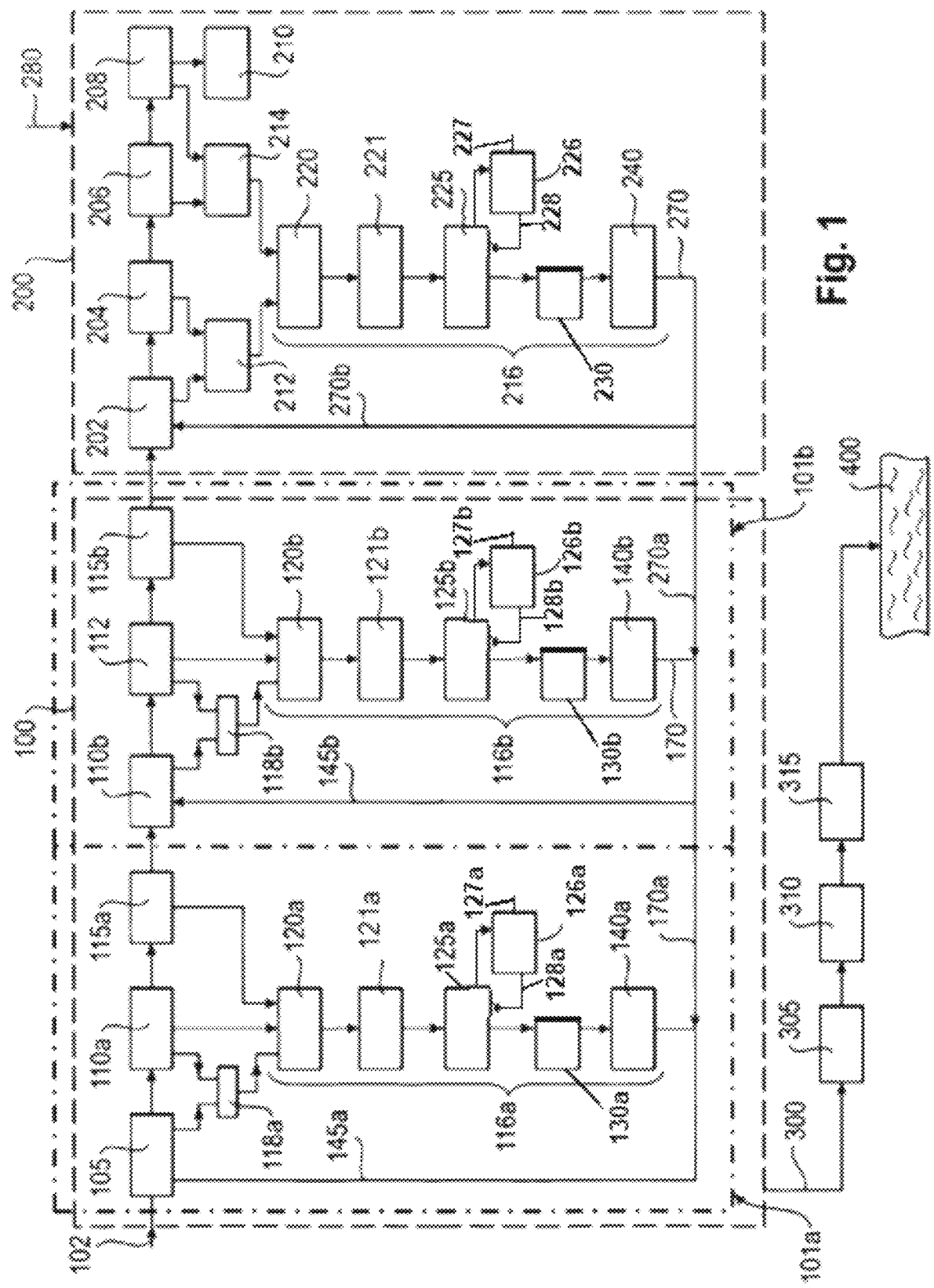
FIG. 1 is a schematic view of a machine according to the invention for manufacturing paper from waste paper, comprising a system according to the invention for cleaning process water circulating in a system, according to an embodiment of the present invention.

The system shown in FIG. 1 comprises a waste paper processing device 100 and a paper machine 200 which is arranged downstream thereof and is connected to the waste paper processing device 100. In this case, the waste paper processing device 100 comprises two stages or loops 101*a* and 101*b* which are substantially decoupled from one another and indicated by the boxes shown by dot-dash lines in FIG. 1.

The first stage 101*a* of the paper processing device 100 comprises a raw material inlet 102, a pulper 105, a sorting means 110*a*, and a dewatering unit 115*a*, which are sequentially arranged and are interconnected in each case. Within the meaning of the present invention, a pulper 105 is understood to mean not only a means, as shown schematically in FIG. 1, consisting of a device part, but rather in particular also a device combination comprising a plurality of individual device parts, which contains all the components or units required for pulping. The same also applies for the sorting means 110*a*, the dewatering unit 115*a*, and all the other components shown in FIG. 1.

The pulper 105 and the sorting means 110*a* are in each case connected to a reject treatment unit 118*a* by means of a line.

Furthermore, the first stage 101*a* of the waste paper processing device 100 comprises a process water processing unit 116*a* which is supplied, via corresponding lines from the reject treatment unit 118*a*, from the sorting device 110*a* and from the dewatering unit 115*a*, with the process water accumulating in said system parts. The process water processing unit 116*a* consists of a material recovery unit 120*a*, a pre-acidification reactor 121*a*, a system according to the invention for cleaning process water which comprises an anaerobic reactor 125a to which anaerobic microorganisms are added, and a solid-liquid separator 126a (for separating process water conveyed away from the anaerobic reactor 125a into a fraction depleted of inorganic solids and a fraction enriched with inorganic solids), comprising a discharge line 127a for the fraction enriched with inorganic solids and comprising a return line 128a for returning the fraction depleted of inorganic solids into the anaerobic reactor 125a, and a chalk elimination unit 130a and a filtration unit 140a. In this case, the chalk elimination unit 130a is designed as a pressure-relief flotation means. The system comprising the anaerobic reactor 125a and the solid-liquid separator 126a, for cleaning process water, is shown in more detail in FIG. 2 and is described in more detail below. From the filtration unit 140a, a return line 145a leads back to the pulper 105. In addition to the material recovery unit 120a or instead of the material recovery unit 120a, a material removal unit (not shown) can be provided in the waste paper processing device 100.

For the sake of completeness, it should be noted that the filtration unit 140a is optional and can also be omitted, i.e. the filtrate can be returned from the chalk elimination unit 130a directly into the return line 145a. Furthermore, a centrifugal sorter can be provided before or after the sorting device 110a. Furthermore, the material recovery unit 120a can be combined with a material removal unit, for example designed as a micro-flotation means.

In contrast with the first stage 101a, the second stage 101b of the waste paper processing device 100 comprises a sorting device 110b connected to the dewatering unit 115a, an oxidation unit or reduction unit 112, and a dewatering unit 115b, which are sequentially arranged and interconnected. Furthermore, the second stage 101b comprises a process water processing unit 116b which is designed in a manner analogous to the process water processing unit 116a of the first stage 101a, i.e. comprises a chalk elimination unit 130b designed as a pressure-relief flotation means, the filtration unit 140b of the second stage 101b of the waste paper processing device 100 being connected to the sorting device 110b via a return line 145b, and being connected to the return line 145a of the first stage 101a of the waste paper processing device 100, emerging from the filtration unit 140a, via a partial flow line 170a. While the sorting device 110b and the oxidation unit or reduction unit 112 are connected via corresponding lines to a reject treatment unit 118b, the dewatering unit 115b is connected directly to the material recovery unit 120b of the process water processing unit 116b. Furthermore, a line leads from the oxidation unit or reduction unit 112 to the material recovery unit 120b.

For the sake of completeness, it should be noted that the filtration unit 140b is optional and can also be omitted. Furthermore, a centrifugal sorter can be provided before or after the sorting device 110b. Furthermore, the material recovery unit 120b can be combined with a material removal unit, for example designed as a micro-flotation means.

The paper machine 200 comprises a centrifugal sorter 202, a fine sorting device 204, a paper-machine mold part 206, a paper-machine press part 208, and a drying part 210, which are sequentially arranged and interconnected. The centrifugal sorter 202 and the fine sorting device 204 are connected to a reject treatment unit 212, and the paper-machine mold part 206 and the paper-machine press part 208 are connected to a fiber recovery unit 214. Furthermore, the reject treatment unit 212 and the fiber recovery unit 214 are connected via corresponding lines to a process water processing unit 216, which consists of a material removal unit 220, a pre-acidification reactor 221, a system according to the invention for cleaning process water which comprises an anaerobic reactor 225 to which anaerobic microorganisms are added, and a solid-liquid separator 226 (for separating process water conveyed away from the anaerobic reactor 225 into a fraction depleted of inorganic solids and a fraction enriched with inorganic solids), comprising a discharge line 227 for the fraction enriched with inorganic solids and comprising a return line 228 for returning the fraction depleted of inorganic solids into the anaerobic reactor 225, and a chalk elimination unit 230 and a filtration unit 240. Furthermore, a return line 270 leads from the filtration unit 240 of the paper machine 200 into the line 170 of the second stage 101b of the waste paper processing device 100. The fiber recovery unit 214 and the material removal unit 220 can also be combined in a device part designed for example as micro-flotation.

Furthermore a fresh water supply line 280 is provided in the region of the paper machine 200, via which fresh water supply line fresh water can be supplied to the paper machine. In this case, the fresh water supply line 280 can open at various locations in the paper machine 200, for example in the supply line to the centrifugal sorter 202 and/or in the paper-machine mold part 206 and/or the paper-machine press part 208, and therefore the exact position of the fresh water supply line 280 is not shown in FIG. 1. Furthermore, a process water line 300 is provided in the system, via which process water line excess process water can be conveyed away out of the system. The process water line 300 can also be arranged at various positions of the system, for example on the line 170, and therefore the exact position of said process water line 300 is likewise not shown in FIG. 1. The process water line for excess process water 300 leads into a mechanical material removal unit 305, downstream of which a cooling unit 310 and a biological treatment unit 315 are connected. A line leads from the biological treatment unit 315 either into a communal (or collective) purification plant for further cleaning, or into a public watercourse 400, for example into a river. However, if necessary, a partial stream or the entirety of the treated process water can also be returned into the paper machine or the material processing.

Figure 2:
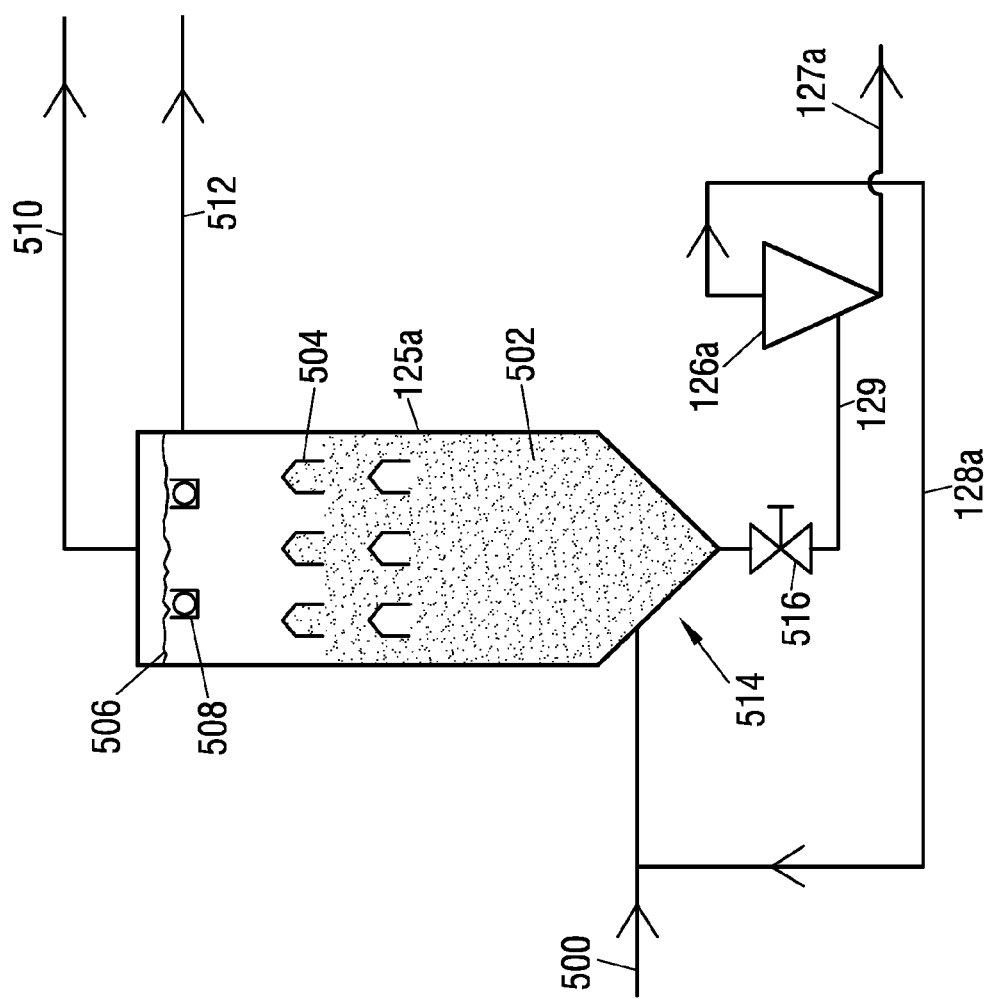
FIG. 2 is a more detailed schematic view of the system according to the invention for cleaning process water, contained in the machine according to the invention shown in FIG. 1 for manufacturing paper from waste paper.

The system according to the invention for cleaning process water, shown in more detail in FIG. 2, comprises the anaerobic reactor 125a and the solid-liquid separator 126a designed as a cyclone 126a. In the anaerobic reactor 125a, a supply line 500, via which process water from the pre-acidification reactor 121a is supplied to the anaerobic reactor 125a, leads into the lower region. Furthermore, the anaerobic reactor 125a contains microorganism pellets 502 of microorganisms, which break down the organic impurities, contained in the process water, into carbon dioxide and methane. A plurality of gas separators 504 are arranged in the upper region of the anaerobic reactor 125a, in order to prevent the microorganism pellets, comprising adhering gas bubbles, from rising up further in the anaerobic reactor 125a, and in order to prevent the gas bubbles, adhering to the microorganism pellets, from separating from the microorganism pellets. Clearwater overflows 508 are arranged above the gas separators 504 but below the liquid level 506. Furthermore, a gas discharge line 510 and a discharge line 512 for cleaned process water from the anaerobic reactor 125a open into the upper region of the anaerobic reactor 125a. The lower region of the anaerobic reactor 125a is designed as a cone 514, and the line 129 for supplying process water into the solid-liquid separator 126a opens at the bottom tip of the cone 514. A valve 516 is provided in the line 129, which valve is controlled by a control means (not shown). The line 129 leads into the solid-liquid separator 126a designed as a cyclone 126a, in which separator the process water, comprising solids dissolved and dispersed therein, is separated by centrifugal force into a fraction depleted of inorganic solids and a fraction enriched with inorganic solids. The fraction enriched with inorganic solids is withdrawn from the lower region of the cyclone 126a and conveyed away out of the system via the discharge line 127a, whereas the fraction depleted of inorganic solids is guided into the supply line 500 via the return line 128a.

During operation of the system shown in FIGS. 1 and 2, waste paper is continuously introduced, via the raw material inlet 102, into the pulper 105 of the first stage 101a of the waste paper processing device 100, in which the waste paper is mixed with the process water returned via the return line 145a and comminuted in order to obtain the fibers. While the fibers obtained in the pulper 105 are transferred continuously into the sorting device 110a, as a fiber suspension, the process water accumulating in the pulper 105, which can contain residues of fibers, is first supplied to the reject treatment unit 118a, and conveyed from there, after separation of the rejects, into the material recovery unit 120a of the process water processing unit 116a of the waste paper processing device 100. In the sorting device 110a, light or heavy undesired components, which are larger than fibers, such as coarse contamination in the form of plastics foils and plastics pieces, are sorted out of the fiber suspension, for example by sieve barriers and typically in a multi-stage manner.

Furthermore, flotation for the purpose of elimination of pigments, ink and color particles (de-inking) can be carried out in the sorting device 110a. Furthermore, in the case of fabric washing, fine materials and ash can be separated. In the dewatering unit 115a arranged downstream of the sorting device 110a, which dewatering unit is preferably designed as a dewatering filter and/or as a screw press, the fiber suspension is compressed by removing process water, in order to travel from the dewatering unit 115a into the sorting device 110b of the second stage 101b of the waste paper processing device 100, as a compressed fiber suspension. A partial stream of the process water accumulating in the sorting device 110a is conveyed into the reject treatment unit 118a, whereas the other partial stream of the process water accumulating in the sorting device 110a, together with the process water accumulating in the dewatering unit 115a of the first stage 101a, is conveyed, via corresponding lines, directly into the material recovery unit 120a of the process water processing unit 116a of the first stage 101a of the waste paper processing device 100, in which fibrous materials contained in the process water are separated therefrom, which fibrous materials are supplied again to the processing process. Preferably, the material recovery unit 120a is designed as a pressure-relief flotation means.

In the case of the system shown in FIG. 1, the process water accumulating in the reject treatment unit 118a is conducted into the material recovery unit 120a. Process water freed of fibrous materials is conveyed continuously from the material recovery unit 120a, initially into the pre-acidification reactor 121a, in which the process water undergoes hydrolysis and acidification. Thereafter, the process water is conveyed into the system according to the invention for cleaning process water which comprises an anaerobic reactor 125a to which anaerobic microorganisms are added, and a solid-liquid separator 126a (for separating process water conveyed away from the anaerobic reactor 125a into a fraction depleted of inorganic solids and a fraction enriched with inorganic solids), comprising a discharge line 127a for the fraction enriched with inorganic solids and comprising a return line 128a for returning the fraction depleted of inorganic solids into the anaerobic reactor 125a. The organic impurities contained in the process water are broken down largely into carbon dioxide and methane, in the anaerobic reactor 125a mixed with anaerobic microorganisms 502, by the effect of the anaerobic microorganisms. The gas thus formed adheres to the microorganism pellets 502 largely in the form of small gas bubbles, the density of which decreases such that the microorganism pellets 502, comprising the adhering gas bubbles, rise upwards in the anaerobic reactor 125a. In this case, said pellets reach the gas separator 504 arranged in the upper region of the anaerobic reactor 125a, in which gas separator the biogas is separated from the microorganism pellets 502 and is then conveyed away out of the anaerobic reactor 125a via the gas discharge line 510. Cleaned process water rises further upwards in the anaerobic reactor 125a, via the upwards-directed flow caused by the process water intake, where said process water is withdrawn via the clearwater overflows 508 and is conveyed away via the discharge line for cleaned process water 512 and supplied to the chalk elimination unit 130a and further to the filtration unit 140a. Inorganic solids, such as in particular chalk, originating from the waste paper, are not broken down by the microorganism pellets 502, and thus collect in the anaerobic reactor 125a. On account of the structure and size thereof, the microorganism pellets 502 act as crystallization nuclei for deposits of inorganic solids, and in particular of chalk, such that, at a certain content of inorganic solids, and in particular of chalk, inorganic solids, and in particular chalk, are deposited on the microorganism pellets 502, with the disadvantages described in detail above. In order to prevent this, according to the invention, process water samples are withdrawn from the anaerobic reactor 125a at specified timepoints, the content of inorganic solids in which samples is measured. This is achieved in that the sample of the process water is filtered, the residue obtained during the filtration is dried in a furnace at 105° C. until no further loss of mass occurs, in order to obtain a dried solids residue, the mass of the dried solids residue is measured, the dried solids residue is heat-treated in a furnace at 550° C. until no further loss of mass occurs, in order to obtain a heat-treated solids residue, and the mass of the heat-treated solids residue is measured. The content of inorganic solids in the process water is then calculated simply as a quotient of the mass of the heat-treated solids residue and the mass of the dried solids residue. The determined values are input into a control means (not shown), into which a limit value for the content of inorganic solids in the process water, of for example 37 wt. %, was already input at the start of the method. The control means compares the measured solids content with the limit value. If the measured content of inorganic solids in the process water is above the limit value, the valve 516 arranged in the supply line 129 is controlled by the control means such that process water is continuously conveyed away from the anaerobic reactor 125a and supplied to the solid-liquid separator 126a. In the solid-liquid separator 126a, designed as a cyclone 126a, the process water is separated into a fraction depleted of inorganic solids and a fraction enriched with inorganic solids. The fraction depleted of inorganic solids is returned to the anaerobic reactor 125a via the return line 128a, whereas the fraction enriched with inorganic solids is conveyed away from the system via the discharge line 127a. In this case, the method is preferably carried out such that the process water is separated in the cyclone 126a in such a way that the fraction depleted of inorganic solids has a content of inorganic solids which is for example 0.7 to 1.0 kg/l, whereas the fraction enriched with inorganic solids has a content of inorganic solids which is for example 2.5 kg/l, and such that the portion of the fraction depleted of inorganic solids is 90 vol. % and the portion of the fraction enriched with inorganic solids is 100 vol. % of the volume flow of the process water introduced into the cyclone 126*a*. As soon as a measurement performed later, on another sample of process water, results in a value below the limit value, the control means deactivates the valve 516, such that no more process water is supplied to the solid-liquid separator 126*a* or the cyclone 126*a*. The cleaned process water, i.e. freed of the chemical and biological impurities, is supplied from the anaerobic reactor 125*a*, via the line 512, into the downstream chalk elimination unit 130*a* and then into the filtration unit 140*a*, which is designed for example as a sand filtration unit, in order to remove the remaining particulate material from the process water. Furthermore, a desalination unit (not shown) can be connected downstream of the filtration unit 140*a*.

The process water cleaned and descaled in the process processing unit 116*a* of the first stage 101*a* of the waste paper processing device 100 is returned to the pulper 105 via the return line 145*a*.

The compressed fiber suspension, conveyed away from the dewatering unit 115*a* of the first stage 101*a* of the waste paper processing device 100, reaches the sorting stage 110*b*, and from there an oxidation unit or reduction unit 112, before the fiber suspension is compressed in the dewatering unit 115*b* of the second stage 101*b*, in order to remove as much of the process water as possible from the fiber suspension. In a manner analogous to the first stage 101*a* of the waste paper processing device 100, the process water accumulating in the sorting device 110*b*, and a partial stream of the process water accumulating in the oxidation unit or reduction unit 112, are conducted into the reject treatment unit 118*b*, and the process water accumulating there is conducted into the material recovery unit 120*b*. The other partial stream of the process water accumulating in the oxidation unit or reduction unit 112, and the process water accumulating in the dewatering unit 115*b*, are conducted directly into the material recovery unit 120*b* of the process water processing unit 116*b* of the second stage 101*b* of the waste paper processing device 100, and cleaned and descaled in the process water processing unit 116*b*. The process water thus treated largely returns to the sorting device 110*b* from the filtration unit 140*b*, via the line 170 and the return line 145*b*, whereas a possible excess of process water is returned to the first stage 101*a* of the waste paper processing device 100 via the partial flow line 170*a* and into the return line 145*a* leading to the pulper 105.

In the paper machine 200, the compressed fibrous material suspension, continuously supplied from the dewatering unit 115*b*, is processed to form paper, by means of the centrifugal sorter 202, in which parts having a specific weight greater or less than water are separated, the fine sorting device 204, the paper-machine mold part 206, the paper-machine press part 208, and the drying part 210. While the process water accumulating in the system parts 202 and 204 is conducted into the reject treatment unit 212, the process water accumulating in the system parts 206 and 208 is conducted into the fiber recovery unit 214. While the rejects are dewatered in the reject treatment unit 212, in the fiber recovery unit 214 the process water originating from the paper-machine mold part 206 and the paper-machine press part 208 undergoes prior material removal, and fibers are separated therefrom. Process water accumulating in the reject treatment unit 212 and in the fiber recovery unit 214 is conducted continuously into the process water processing unit 216 of the paper machine 200, and there flows sequentially through the material removal unit 220, the pre-acidification reactor 221, the anaerobic reactor 225 and, if the limit value is exceeded, the solid-liquid separator, the chalk elimination unit 230 and the filtration unit 240, which are operated in the manner of the corresponding system parts of the process water processing units 116*a*, 116*b* of the waste paper processing device 100, described above. Alternatively thereto, the process water accumulating in the reject treatment unit 212 can be conveyed away from the system as waste water, and only the process water accumulating in the fiber recovery unit 214 can be conducted continuously through the process water processing unit 216 of the paper machine 200. The cleaned and descaled process water withdrawn from the filtration unit 240 is largely returned to the centrifugal sorter 202 of the paper machine 200 via the return line 270 and the partial flow line 270*b*, whereas a possible excess of process water is conveyed into the line 170 emerging from the filtration unit 140*b* of the second stage 101*b* of the waste paper processing device 100, via the partial flow line 270*a*.

A completely closed process water circuit is possible in principle, but would possibly lead, in the long term, to concentrations of impurities, which would ultimately impair the efficiency of the system. A relatively small portion of fresh water, with respect to the amount of water evaporated in the drying part, is supplied continuously to the process, preferably the paper machine 200, via the fresh water supply line 280. It is possible, in the case of productions having particular requirements for a low content of impurities, such as salts, to remove a corresponding amount of process water from the process, via the process water line 300, and to clean it further using the material removal unit 305, the cooling unit 310 and the biological treatment unit 315, before said stream is conducted away in the public sewerage system or watercourse 400. Furthermore, the process water optionally conveyed away from the reject treatment units 118*a*, 118*b*, 212, as mentioned above, can also be removed from the process via the process water line 300, and cleaned by the material removal unit 305, the cooling unit 310, and the biological treatment unit 315, and returned to the process.

In FIG. 1, the system comprises two-stage material processing. Of course, it is also possible, in particular in the case of manufacturing multilayered paper, to provide two or more parallel material processing stages.

Figure 3:
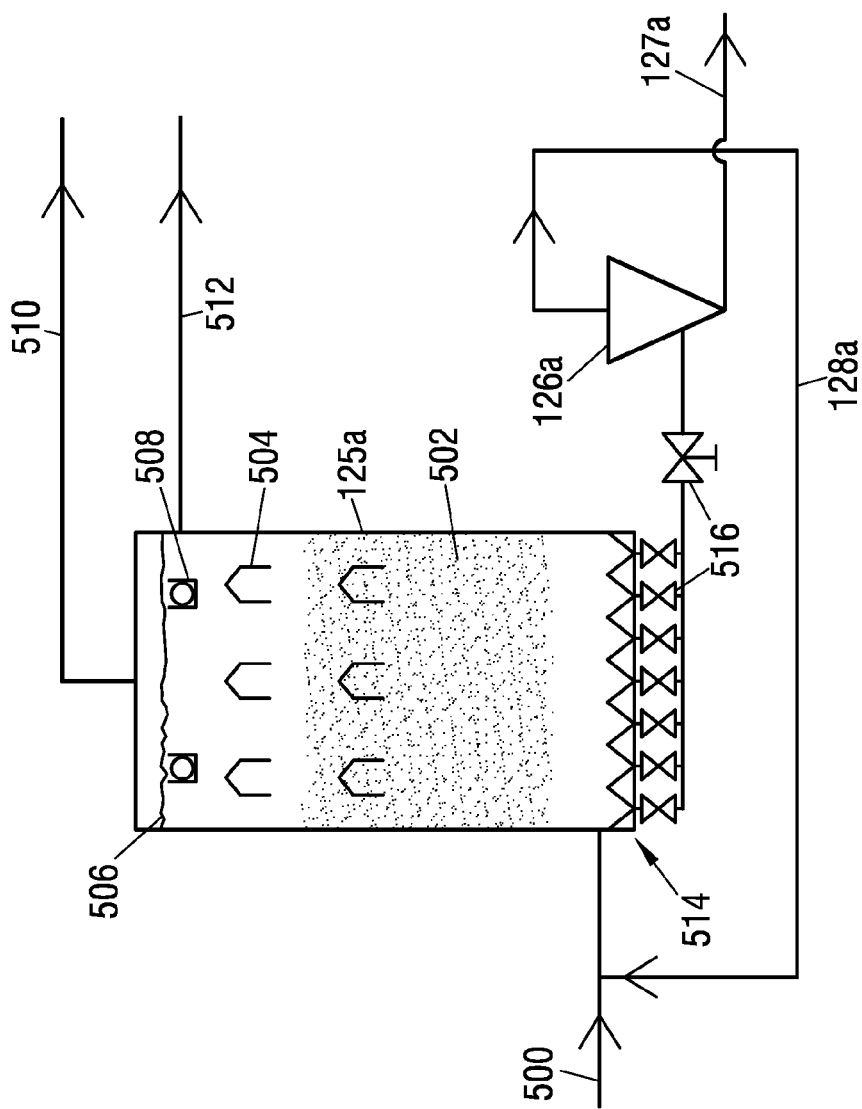
FIG. 3 is a schematic view of a system according to the invention for cleaning process water, according to a first embodiment.

The anaerobic reactor 125*a* shown in FIG. 2 comprises a lower region which is designed as a cone. According to an embodiment alternative thereto and shown in FIG. 3, the anaerobic reactor 125*a* can also comprise a lower region which comprises a plurality of cones. As shown in FIG. 3, in this alternative embodiment, the lower 5 region of the anaerobic reactor, viewed in cross section, is designed in a zigzag shape. In this embodiment, the reactor base thus comprises a plurality of adjacent conical regions, such that the overall surface of the slopes of the reactor wall of the reactor base is larger than in the previously described embodiment, in which the reactor base is designed as a cone.

LIST OF REFERENCE SIGNS

100 waste paper processing device
101*a* first stage of the waste paper processing device
101*b* second stage of the waste paper processing device
102 raw material inlet
105 pulper
110*a*, 110*b* sorting device 112 oxidation unit/reduction unit
115a, 115b dewatering unit
116a, 116b process water processing unit of the material/waste paper processing device
118a, 118b reject treatment unit
120a, 120b material recovery unit
121a, 121b pre-acidification reactor
125a, 125b anaerobic reactor
126a, 126b solid-liquid separator/cyclone
127a, 127b discharge line
128a, 128b return line
129 line for supplying process water into the solid-liquid separator
130a, 130b chalk elimination unit
140a, 140b filtration unit
145a, 145b return line
170 line
170a partial flow line
200 paper machine
202 centrifugal sorter
204 fine sorting device
206 paper-machine mold part
208 paper-machine press part
210 drying part
212 reject treatment unit
214 fiber recovery unit
216 process water processing unit of the paper machine
220 material removal unit
221 pre-acidification reactor
225 anaerobic reactor
226 solid-liquid separator/cyclone
227 discharge line
228 return line
230 chalk elimination unit
240 filtration unit
270 return line
270a, 270b partial flow line
280 fresh water supply line
300 process water line
305 mechanical material removal unit
310 cooling unit
315 biological treatment unit
400 public watercourse
500 supply line
502 microorganism pellets
504 gas separator
506 liquid level
508 clearwater overflows
510 gas discharge line
512 discharge line for cleaned process water
514 cone/conical region
516 valve

The invention claimed is:

1. Method for continuous cleaning of process water circulating in a device for processing waste paper (100) and/or in a paper machine (200) of a machine for manufacturing paper from waste paper, in which process water to be cleaned is supplied, from at least one unit of the device (100) and/or the paper machine (200), to a process water processing unit having an anaerobic reactor (125a, 125b, 225) comprising one or more gas separators (504), the process water is contacted, in the anaerobic reactor (125a, 125b, 225), with anaerobic microorganisms in order to break down impurities contained in the process water, and the cleaned process water is conveyed away from the anaerobic reactor (125a, 125b, 225) and returned to at least one unit of the device (100) and/or the paper machine (200), wherein at least one unit is selected from one or more of a pulper (105), sorting device (110a, 110b), dewatering unit (115a, 115b), oxidation/reduction unit (112), centrifugal sorter (202), fine sorting device (204), paper-machine mold part (206), paper-machine press part (208), reject treatment unit (118a, 118b, 212), fiber recovery unit (214) and drying part (210), wherein, in the method, a content of inorganic solids in the process water contained in the anaerobic reactor (125a, 125b, 225) is measured continuously or discontinuously and, when the content of inorganic solids in the process water contained in the anaerobic reactor (125a, 125b, 225) exceeds a pre-set limit value, process water is continuously supplied, from the anaerobic reactor (125a, 125b, 225), to a solid-liquid separator (126a, 126b, 226) for separation into a fraction depleted of inorganic solids and a fraction enriched with inorganic solids, wherein the fraction depleted of inorganic solids is returned to the anaerobic reactor (125a, 125b, 225) at least in part and the fraction enriched with inorganic solids is conveyed away from the device (100) and/or the paper machine (200), until the content of inorganic solids in the process water contained in the anaerobic reactor (125a, 125b, 225) is less than the pre-set limit value.

2. Method according to claim 1, wherein the process water supplied continuously to the solid-liquid separator (126a, 126b, 226) from the anaerobic reactor (125a, 125b, 225) is removed from the lower region of the anaerobic reactor (125a, 125b, 225).

3. Method according to claim 1, wherein the lower region of the anaerobic reactor (125a, 125b, 225), viewed in cross section, is designed in a zigzag shape, the zigzag-shaped region extending over 1 to 50% of the height of the anaerobic reactor (125a, 125b, 225).

4. Method according to claim 1, wherein the lower region of the anaerobic reactor (125a, 125b, 225), viewed in cross section, is designed as a cone (514), the cone (514) extending over 1 to 20% of the height of the anaerobic reactor (125a, 125b, 225).

5. Method according to claim 1, wherein the limit value for the content of inorganic solids in the process water contained in the anaerobic reactor (125a, 125b, 225) is pre-set to a value between 30 and 45 wt. %.

6. Method according to claim 1, wherein process water from the anaerobic reactor (125a, 125b, 225) is supplied continuously to a solid-liquid separator (126a, 126b, 226), and the fraction depleted of inorganic solids is returned to the anaerobic reactor (125a, 125b, 225), at least in part, until the content of inorganic solids in the process water contained in the anaerobic reactor (125a, 125b, 225) is at least 1% less than the pre-set limit value.

7. Method according to claim 1, wherein the process water is separated in the solid-liquid separator (126a, 126b, 226) such that the portion of the fraction depleted of inorganic solids is at least 70 vol. %, and the portion of the fraction enriched with inorganic solids amounts to the remainder up to 100%, with respect to the volume flow of the process water supplied to the solid-liquid separator (126a, 126b, 226).

8. Method according to claim 1, wherein the process water is separated in the solid-liquid separator (126a, 126b, 226) such that the content of inorganic solids in the fraction enriched with inorganic solids is at least 25% higher than the content of inorganic solids in the fraction depleted of inorganic solids.

9. Method according to claim 1, wherein the solid-liquid separator (126a, 126b, 226) comprises one or more centrifugal separators (126a, 126b, 226).

10. Device for processing waste paper (100), and/or paper machine (200) of a machine for manufacturing paper from waste paper, the device (100) and/or the paper machine (200) comprising a process water processing unit (116a, 116b, 216) for cleaning process water circulating in the device (100) and/or the paper machine (200), and comprising at least one unit selected from one or more of a pulper (105), sorting device (110a, 110b), dewatering unit (115a, 115b), oxidation/reduction unit (112), centrifugal sorter (202), fine sorting device (204), paper-machine mold part (206), paper-machine press part (208), reject treatment unit (118a, 118b, 212), fiber recovery unit (214) and drying part (210), and the process water processing unit (116a, 116b, 216) comprising:

i) an anaerobic reactor (125a, 125b, 225) comprising one or more gas separators (504), for anaerobic cleaning of process water, comprising at least one supply line (500) for supplying process water to be cleaned to the anaerobic reactor (125a, 125b, 225), and at least one discharge line (512) for conveying away cleaned process water out of the reactor (125a, 125b, 225), the process water processing unit (116a, 116b, 216) being connected to at least one of the at least one unit, such that, during operation of the device (100) and/or paper machine (200), process water to be cleaned is supplied from the at least one unit to the process water processing unit (116a, 116b, 216) and, therein, the anaerobic reactor (125a, 125b, 225), and after the process water processing step cleaned process water is returned into the at least one unit, and ii) a solid-liquid separator (126a, 126b, 226) for separating process water conveyed away from the anaerobic reactor (125a, 125b, 225) into a fraction depleted of inorganic solids and a fraction enriched with inorganic solids, comprising a discharge line (127a, 127b, 227) for the fraction enriched with inorganic solids and comprising a return line (128a, 128b, 228) for returning the fraction depleted of inorganic solids into the anaerobic reactor (125a, 125b, 225), at least in part, a further line leading from the anaerobic reactor (125a, 125b, 225) to the solid-liquid separator (126a, 126b, 226) for supplying process water conveyed away from the anaerobic reactor (125a, 125b, 225), wherein this further comprises iii) a measuring device for measuring the content of inorganic solids in the process water contained in the anaerobic reactor (125a, 125b, 225), and in that this also comprises a control means which can receive measuring data regarding the content of inorganic solids in the process water contained in the anaerobic reactor (125a, 125b, 225) and into which a limit value and optionally a threshold value can be input, the control means being designed such that it automatically starts the continuous removal of process water from the anaerobic reactor (125a, 125b, 225) and the supply thereof into the solid-liquid separator (126a, 126b, 226), when an input limit value for the inorganic solids content in the process water contained in the anaerobic reactor (125a, 125b, 225) is exceeded, and automatically ends the continuous removal of process water from the anaerobic reactor (125a, 125b, 225), and the supply thereof into the solid-liquid separator (126a, 126b, 226), in the event of falling below the limit value or an input threshold value for the inorganic solids content in the process water contained in the anaerobic reactor (125a, 125b, 225).

11. Device (100) and/or paper machine (200) according to claim 10, wherein the lower region of the anaerobic reactor (125a, 125b, 225), viewed in cross section, is designed in a zigzag shape, the zigzag-shaped region extending over 1 to 50% of the height of the anaerobic reactor (125a, 125b, 225).

12. Device (100) and/or paper machine (200) according to claim 10, wherein the lower region of the anaerobic reactor (125a, 125b, 225), viewed in cross section, is designed as a cone (514), the cone (514) extending over 1 to 50% of the height of the anaerobic reactor (125a, 125b, 225).

13. Device (100) and/or paper machine (200) according to claim 10, wherein the solid-liquid separator (126a, 126b, 226) comprises one or more centrifugal separators (126a, 126b, 226).

14. Device (100) and/or paper machine (200) according to claim 10, wherein the one or more gas separators (504) in the anaerobic reactor (125a, 125b, 225) are arranged at a height of between 30 and 90% with respect to the height of the anaerobic reactor (125a, 125b, 225).

15. Device (100) and/or paper machine (200) according to claim 10, wherein the one or more gas separators (504) are designed such that they prevent anaerobic microorganism pellets (502) from flowing further up in the anaerobic reactor (125a, 125b, 225), and thus result in gas adhering to the surface of the anaerobic microorganism pellets (502) being released and the gas being conveyed away out of the anaerobic reactor (125a, 125b, 225) via the gas separator.

16. Machine for manufacturing paper from waste paper, comprising a device for processing waste paper (100) and a paper machine (200) according to claim 10, wherein the device (100) comprises one, two or more stages (101a, 101b), each stage (101a, 101b) comprising a dewatering unit (115a, 115b) and at least one further unit selected from one or more of pulper (105), sorting device (110a, 110b) and oxidation/reduction unit (112), each stage (101a, 101b) and the paper machine (200) in each case comprising a process water processing unit (116a, 116b, 216) having the features of claim 10 relating to the process water processing unit.

17. Machine according to claim 16, wherein the paper machine (200) comprises at least one unit selected from a centrifugal sorter (202), fine sorting device (204), paper-machine mold part (206), paper-machine press part (208), reject treatment unit (212), fiber recovery unit (214), and drying part (210).

* * * * *